3,520,856
PROCESS FOR THE PRODUCTION OF POLYMERS FROM CYCLOMONOOLEFINS AND DIENES HAVING A PREDETERMINED MOLECULAR WEIGHT AND THE POLYMERS THEREOF
Gino Dall'Asta, Milan, Italy, assignor to Montecatini Edison S.p.A., Milan, Italy
No Drawing. Filed Dec. 20, 1966, Ser. No. 608,482
Claims priority, application Italy, Dec. 21, 1965, 28,378/65
Int. Cl. C08c *11/54;* C08d *11/00;* C08f *27/06*
U.S. Cl. 260—79.5         12 Claims

ABSTRACT OF THE DISCLOSURE

Copolymers consisting essentially of polymerized units of cycloolefins and of relatively small amounts of polymerized units of conjugated dienes are disclosed. The copolymers exhibit the crystallinity of polyalkeneamers and are obtained by copolymerizing a mixture of cycloolefin and conjugated diene in a molar ratio of 10:1 to 10,000:1, in contact with a catalyst prepared from a tungsten salt and an organometallic compound or metal hydride of a Group I to III metal. The relatively small amount of polymerized units of conjugated diene present in the copolymer functions as a regulator of the molecular weight, which can be varied and controlled by varying the amount of the diene available for copolymerization with the monoolefin during the copolymerization reaction.

PRIOR DISCLOSURES

Linear, unsaturated homopolymers of cycloolefins having the structure of polyalkeneamers have been described in applications for U.S. Pat. Ser. Nos. 339,455 filed Jan. 22, 1964, now Pat. 3,458,489, July 28, 1969, and 425,956 filed Jan. 15, 1965, now Pat. 3,459,725 Aug. 5, 1969. However, such homopolymers often have a molecular weight which is too high to permit of the homopolymers being readily processed to synthetic rubbers.

Copolymers resulting from the copolymerization of cycloolefins and conjugated dienes in molar ratios of from 1:1 to 10:1, such as are disclosed in Italian application No. (Milan) 12,561, now Pat. 789,585, have a low molecular weight, generally between 1000 and about 4000 to 5000 corresponding to intrinsic viscosity values lower than 0.3 dl./g. and are also unsuitable for processing to synthetic rubbers.

THE PRESENT INVENTION

An object of this invention is to provide a process for copolymerizing cycloolefins and conjugated dienes to copolymers having a regulated molecular weight (corresponding to intrinsic viscosity values in the range between 0.3 and 5 dl./g., preferably between 1 and 5 dl./g.) such that the copolymers can be readily processed, i.e. mill-mixed, Banbury-mixed, calendered, and extruded before being vulcanized.

Another object is to provide the new copolymers having the regulated molecular weight.

These and other objects are accomplished by the present invention in accordance with which it has been found that an effective regulation of the molecular weight of cycloolefin/conjugated diolefin copolymers can be achieved by varying the amount of the conjugated diolefin available for copolymerization with the cycloolefin.

Briefly, and more specifically, in accordance with this invention copolymers having a molecular weight suitable for processing as elastomers are obtained by copolymerizing a cycloolefin with a conjugated diolefin in a cycloolefin to conjugated diolefin molar ratio of from 10:1 to 10,000:1.

Cyclomonoolefins which are useful in the practice of this invention are a 4,5 or from 7- to 12-membered cyclomonoolefin including, particularly, cyclobutene, cyclopentene, cycloheptene, cyclooctene, cyclodecene and cyclododecene, and are comprised in the general formula

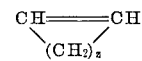

wherein $z$ is 2,3 or from 5 to 10.

Conjugated diolefins suitable for use in the practice of the invention are those having one of the general formula ($\alpha$) 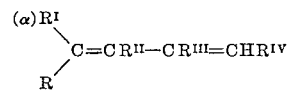

in which R, $R^I$, $R^{II}$ and $R^{III}$ and $R^{IV}$ represent a hydrogen atom or an alkyl group containing 1 to 4 carbon atoms and may be the same or different; or ($\beta$) 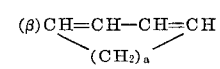

in which $a$ is 1 or 2.

Particularly suitable conjugated diolefins are butadiene, isoprene, 1,3-pentadiene, 2,3-dimethyl-1,3-butadiene, 4-methyl - 1,3-pentadiene, 2,4-hexadiene, cyclopentadiene and cyclo-1,3-hexadiene. The copolymers obtained using 1,3-pentadiene, 2,3-dimethyl 1,3-butadiene; 4,4-dimethyl 1,3-butadiene; 2-4-hexadiene, and cyclo 1,3-hexadiene are more particularly useful in practicing the invention.

The cycloolefin and conjugated diolefin are copolymerized in contact with a catalyst system prepared from a tungsten salt and an organometallic compound or metal hydride of a metal belonging to Groups I to III, inclusive, of the Mendelyeev Periodic Table. Optionally, the tungsten salt may be admixed with a halide of the Friedel-Crafts type and a peroxidic compound may be included as catalyst-forming component.

The relative amounts of cycloolefin and conjugated diolefin in the copolymerization mixture in contact with the catalyst is such that the cycloolefin to diolefin molar ratio is from 10:1 to 10,000:1, preferably from 30:1 to 500:1.

The catalytic mixtures are sensitive to oxygen and air. Therefore, the copolymerization is carried out in an inert atmosphere, such as under nitrogen.

Tungsten salts which are particularly useful as one catalyst forming component are the halides such as e.g., $WCl_6$, $WOCl_4$, $WBr_5$, $WCl_4$, $WCl_2$ and the combination of $WCl_2 \cdot \frac{1}{3} AlCl_3$ obtained by reduction of $WCl_6$ with stoichiometric amounts of aluminum metal.

The preferred organometallic and metal hydride compounds are those af aluminum, beryllium, magnesium, calcium and zinc, such as, for example,

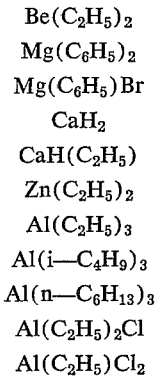

Al(C$_2$H$_5$)$_2$F

Al(C$_2$H$_5$)$_2$Br

AlH(i—C$_4$H$_9$)$_2$

Al(C$_2$H$_5$)$_2$—O—C$_2$H$_5$

The organometallic aluminum compounds are preferred catalyst-forming components.

Preferably, the molar ratio of tungsten to organometallic compound or hydride of the Groups I–III metal is from 1:0.2 to 1:100.

Periodic compounds can be included in the catalyst in an amount of 0.1 to 5.0 mols per mole of the tungsten salt. Particularly suitable are organic peroxides of the type of benzoyl peroxide, and hydroperoxides.

The amount of catalytic mixture used is selected to provide one mole of tungsten compound per 50 to 5,000 mols of the mixture of cycloolefin and diene.

The catalyst can be prepared separately in an inert diluent such as an aliphatic or aromatic hydrocarbon solvent. Preferably, however, the catalyst is prepared directly in the liquid mixture of the comonomers, in the absence of an inert diluent, at the copolymerization temperature. The copolymerization starts as soon as the tungsten compound and organometallic compound are contacted with the comonomers mixture.

The copolymerization is carried out at a temperature of from —100° C. to +100° C., preferably at —50° C. to +20° C.

The copolymerization reaction can be continued until all of the comonomers mixture is utilized, but it is preferable, usually, to interrupt the copolymerization when from 30% to 60% of the cycloolefin has been accepted into the copolymer macromolecule, in order to avoid cross-linking of the copolymer chains and such compacting of the copolymers as would complicate removal thereof from the copolymerization reaction vessel.

It has been observed that since the copolymers produced in accordance with this invention contain only small amounts of polymerized units of the conjugated diolefin, the copolymer has essentially the characteristics of homopolymers of the cycloolefin used in the copolymerization with the notable distinction that the copolymer has a lower, regulated molecular weight as compared to the homopolymer.

The copolymers are non-tacky or only slightly tacky, and are soluble in aromatic, aliphatic and chlorinated hydrocarbon solvents while being insoluble or only slightly soluble in lower alcohols, ethers and ketones. The number of double bonds in the copolymers can be determined by infrared analysis, using the following characteristic bands:

10.35 microns for 1,4-trans double bonds
7.12 microns for 1,4-cis double bonds
10.98 microns for 1,2 double bonds.

The relative proportions of the cycloolefin and diene units in the copolymers can be determined by radiochemical analysis.

The copolymers can be readily vulcanized using vulcanizing recipes based on sulfur and accelerators or sulfur-donors and accelerators and such as are normally used for the vulcanization of highly unsaturated elastomers.

The following examples are given to illustrate the invention and are not limiting.

Example 1

The polymerization vessel consists of a flask provided with stirrer, nitrogen-inlet tube and an inlet tube for the reactants.

Air is replaced inside the flask by dry nitrogen and 10 ml. (7.7 g.; 113 millimols) of cyclopentene are introduced.

After cooling to —20° C., there are introduced while vigorously agitating:

1,3-pentadiene—0.452 millimols
WCl$_6$—90 mg. (0.226 millimols)
Al(C$_2$H$_5$)$_2$Cl—1.13 millimols The molar ratios used are:

Cycloolefin/conjugated diene=250:1
Cycloolefin/WCl=500:1
WCl$_6$/Al(C$_2$H$_5$)$_2$Cl=1:5

The polymerization is carried out for 4 hours at —30° C.

The copolymer, obtained in a yield of 21%, is an elastice solid and contains cis inner double bonds in proportion corresponding to 20% of the monomeric units and trans double bonds in proportion corresponding to about 80% of the monomeric units.

It appears to be crystalline by X-ray examination. The crystallinity corresponds to that of trans-polypentenamer. It has an intrinsic viscosity, in toluene at 30° C., of 3.09 dl./g.

A further run(blank) carried out under the same conditions, but in absence of 1,3-pentadiene, yields a trans-tactic homopolymer having the same type of crystallinity, but an intrinsic viscosity, in toluene at 30° C., of 5.1 dl./g.

Example 2

Example 1 is repeated but using a cycloolefin/conjugated diene molar ratio of 30:1 and carrying out the copolymerization for 8 hours at —30° C.

The copolymer, obtained in a yield of 12%, is a plastic solid and contains cis inner double bonds in proportion corresponding to 24% of the monomeric units and trans inner double bonds in proportion corresponding to about 76% of the monomeric units. It is found to be crystalline by X-ray examination. The crystallinity corresponds to that known for the trans-polypentenamer. It has an intrinsic viscosity, in toluene at 30° C., of 1.78 dl./g.

Example 3

The copolymerization is carried out as in Example 1, by using the following reactants:

Cyclopentene—10 ml.(7.7 g.; 113 millimols)
1,3-pentadiene—0.904 millimols
3WCl$_2$·4AlCl$_3$—93 mg.(0.226 millimols)
Al(C$_2$H$_5$)$_2$Cl—0.226 millimols The molar ratios are:

Cycloolefin/conjugated diene=125:1
Cycloolefin/WCl$_2$=500:1
WCl$_2$/Al(C$_2$H$_5$)$_2$Cl=1:1

The copolymerization is carried out for 7 hours and 30 minutes at —20° C.

The copolymer, obtained in a yield of 18%, is an elastic solid and contains cis inner double bonds in proportion corresponding to 28% of the monomeric units and trans inner double bonds in proportion of about 72% of the monmeric units. It is found to be crystalline by X-ray examination. The crystallinity is the same as that known for the trans-polypentenamer.

It has an intrinsic viscosity, in toluene at 30° C., of 4.5 dl./g.

A run (blank) carried out under the same conditions in the absence of 1,3-pentadiene gives a transtatic polymer having the same type of crystallinity but with an intrinsic viscosity, in toluene at 30° C., of 17 dl./g.

Example 4

Example 3 is repeated but using a cycloolefin/conjugated diene molar ratio of 38:1 and carrying out the copolymerization for 8 hours at —20° C.

The copolymer, obtained in a yield of 8%, is an elastic solid which contains cis inner double bonds in proportion of 15% of the monomeric units and trans inner double bonds in proportion of 48% of the monomeric units. It is found to be crystalline by X-ray examination.

The crystallinity corresponds to that known for the transpolypentenamer. It has an intrinsic viscosity, in toluene at 30° C., of 1.0 dl./g.

Example 5

The copolymers obtained in Examples 1 and 4 are vulcanized at 160° C. for 60 minutes with the following recipe:

100 parts of copolymer
1.75 parts of sulfur
1.0 part of Vulcafor HBS (N-cyclohexyl-2-benzothiazol-sulphenamide)
5.0 parts of zinc oxide
1.0 part of stearic acid.

The vulcanizates obtained are synthetic rubbers.

Examples 6–13

The polymerization vessel consists of a flask provided with stirrer, nitrogen-inlet tube and an inlet tube for the reactants. Air is replaced inside the flask by dry nitrogen and 20 ml. (0.226 mole) of cyclopentene is introduced.

104 mg. dicumylperoxide and
164 mg. $3WCl_2 \cdot 4AlCl_3$ are introduced, and the mixture is cooled to —30° C., while vigorously stirring. Then, 0.94 millimol of diethyl aluminum monochloride is added. During the polymerization, which starts immediately after the addition of the aluminum organic compound, a conjugated diene (as shown in the table hereinbelow), dissolved in 2 ml. of cyclopentene, is dropwise added over a period of 2 to 2½ hours. Polymerization is then continued for 18 hours. The reaction mass is quenched and the copolymer is isolated as described in Example 1.

Results of the Examples 6–13 are given in the following table:

| Example No. | Conjugated diene added to the polymerization mixture | Millimoles | Copolymer yield, percent | Trans double bonds (°) percent | $[\eta]$ (°°) dl./g |
|---|---|---|---|---|---|
| 6 | 1,3-butadiene | 1.8 | 39 | 60 | 3.0 |
| 7 | 1,3-isoprene | 1.2 | 22 | 67 | 4.8 |
| 8 | 1-methyl-1-trans,3-butadiene | 1.1 | 50 | 70 | 2.1 |
| 9 | 1,4-methyl 2-cis,4-trans-butadiene. | 0.9 | 34 | 75 | 3.9 |
| 10 | 2,3-dimethyl-1,3-butadiene | 0.9 | 31 | 79 | 4.2 |
| 11 | 4,4-dimethyl-1,3-butadiene | 0.9 | 30 | 81 | 4.1 |
| 12 | Cyclopentadiene | 1.5 | 12 | 64 | 5.0 |
| 13 | Cyclo-1,3-hexadiene | 0.9 | 20 | 79 | 3.5 |

(°) Referred to the total amount of double bonds in the copolymer.
(°°) Intrinsic viscosity in toluene at 30° C.

The polymerizate obtained under the above conditions but in the absence of a conjugated diene is a partially cross-linked polypentenamer the soluble fraction of which has an intrinsic viscosity, determined in toluene at 30° C., of from 7 to 10 dl./g., indicating that it has a much higher molecular weight than the copolymers of this invention, which are linear and of regulated molecular weight in a more or less medium range corresponding to an intrinsic viscosity, determined in toluene at 30° C., in the range 0.3 to 5 dl./g., preferably between 1 to 5 dl./g.

The macromolecules of the linear, unsaturated copolymers of this invention are made up of (A) units having the formula $$-CH=CH-(CH_2)_z-$$ 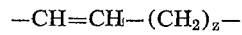

in which z is a whole number selected from the group consisting of 2, 3, 5 and 10 and (B) units derived from a 1,4 polymerization of the conjugated diene.

The molar ratio of units (A) to units (B) in the copolymer is from about 10:1 to about 10,000:1.

It will be apparent that various modifications may be made in practicing the invention without departing from the spirit thereof. It is intended, therefore, to include in the scope of the appended claims all such variations which will be obvious to those skilled in the art from the description and working examples given herein.

What is claimed is:

1. A process for producing linear, unsaturated vulcanizable copolymers having a regulated molecular weight corresponding to an intrinsic viscosity of from 1 to 5 dl./g. determined in toluene at 30° C., and rendering the copolymers readily processable to synthetic rubbers, which process comprises copolymerizing a mixture of a cyclomonoolefin selected from the group consisting of 4, 5 and 7 to 12-membered cyclomonoolefins with a conjugated diolefin selected from the group consisting of 5- and 6-membered isocyclic dienes and dienes having the general formula

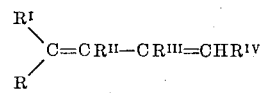

in which R to $R^{IV}$ inclusive may be the same or different and represent a member selected from the group consisting of hydrogen and alkyl groups containing from 1 to 4 carbon atoms, in contact with a catalyst consisting essentially of the product obtained by mixing a tungsten halide with a substance selected from the group consisting of organometallic compounds and hydrides of metals belonging to Groups I to III inclusive of the Mendelyeev Periodic Table, the molar ratio of tungsten to organometallic compound or hydride being from about 1:0.2 to 1:100, the catalyst/monomers molar ratio being such that the molar ratio of the tungsten halide to the mixed monomers is about 1.0 mol of the halide per 50 to 5,000 mols of the mixture of cyclomonoolefin and conjugated diolefin, and the molar ratio of the cyclomonoolefin to conjugated diolefin mixture in contact with the catalyst being maintained at from 10:1 to 10,000:1.

2. The process according to claim 1, characterized in that the tungsten halide is mixed with a Friedel-Crafts halide.

3. The process according to claim 1, characterized in that an organic peroxide is included in the catalyst in an amount of from 0.1 mol to 5.0 mols per mol of the tungsten halide.

4. The process according to claim 1, characterized in that the cyclomonoolefin is selected from the group consisting of cyclobutene
cyclopentene
cycloheptene
cyclooctene
cyclodecene
cyclododecene and the conjugated diene is selected from the group consisting of 1,3-butadiene
1,3-isoprene 1,3-pentadiene
2,3-dimethyl-1,3-butadiene
2,4-hexadiene
cyclopentadiene
cyclo-1,3-hexadiene
4-methyl-1,3-pentadiene 5. The process according to claim 1, characterized in that the molar ratio of the cycloolefin to conjugated diene in the mixture in contact with the catalyst is maintained at from 30:1 to 500:1.

6. The process according to claim 1, characterized in that the copolymerization is carried out at a temperature of from $-100°$ C. to $+100°$ C.

7. The process according to claim 1, further characterized in that the copolymerization is carried out at a temperature of from $-50°$ C. to $+20°$ C.

8. The process according to claim 1, further characterized in that the catalyst consists essentially of the product obtained by mixing $3WCl_2 \cdot 4AlCl_3$ with $Al(C_2H_5)_2Cl$.

9. The process according to claim 1, characterized in that the catalyst consists essentially of the product obtained by mixing $WCl_6$ with $Al(C_2H_5)_2Cl$.

10. Linear, unsaturated, vulcanizable copolymers the macromolecules of which are made up of (1) units of a cyclomonoolefin selected from the group consisting of 4, 5 and 7- to 12-membered cyclomonoolefins and (2) units of a conjugated diolefin selected from the group consisting of 5- and 6-membered isocyclic dienes and dienes having the general formula

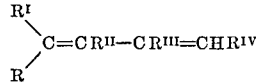

in which R to $R^{IV}$ inclusive represent a member selected from the group consisting of hydrogen and the same and different alkyl radicals containing from 1 to 4 carbon atoms, the molar ratio of units of (1) and (2) in the copolymer being from about 10:1 to 10,000:1, and said copolymers having a regulated molecular weight corresponding to an intrinsic viscosity, determined in toluene at 30° C., of from 1 to 5 dl./g., and rendering the copolymers readily processable to sulfur-vulcanized synthetic rubbers.

11. Copolymers of cyclopentene and a conjugated diene selected from the group consisting of 1,3-pentadiene, 2,3-dimethyl 1,3-butadiene, 4,4-dimethyl 1,3-butadiene, 2,4-hexadiene and cyclo-1,3-hexadiene according to claim 10.

12. The copolymers of claim 10 sulfur-vulcanized to synthetic rubbers.

References Cited

UNITED STATES PATENTS

| | | | |
|---|---|---|---|
| 3,250,313 | 5/1966 | Irvin | 159—47 |
| 3,366,616 | 1/1968 | Tietz | 260—93.1 |
| 3,385,840 | 5/1968 | Natta | 260—88.2 |
| 3,403,139 | 9/1968 | Natta | 260—88.2 |

OTHER REFERENCES

Chem. Abst., 58, 9250e.
Chem. Abst., 65, 3996d.

JOSEPH L. SCHOFER, Primary Examiner

C. A. HENDERSON, Jr., Assistant Examiner

U.S. Cl. X.R.

252—429; 260—23.7, 82.1, 82.5, 85.3, 788